No. 881,439. PATENTED MAR. 10, 1908.
F. M. PETERS.
DOUGH SHEETING MACHINE.
APPLICATION FILED OCT. 8, 1906.

7 SHEETS—SHEET 3.

WITNESSES:
Gustave Dieterich
Edwin H. Dietrich

INVENTOR
Frank M. Peters
BY
Conrad A. Dieterich
his ATTORNEY

No. 881,439.　　　　　　　　　　　　PATENTED MAR. 10, 1908.
F. M. PETERS.
DOUGH SHEETING MACHINE.
APPLICATION FILED OCT. 8, 1906.

7 SHEETS—SHEET 5.

WITNESSES:
Gustave Dieterich
Edwin F. Dieterich

INVENTOR
Frank M. Peters
BY
Conrad A. Dieterich
his ATTORNEY

No. 881,439. PATENTED MAR. 10, 1908.
F. M. PETERS.
DOUGH SHEETING MACHINE.
APPLICATION FILED OCT. 8, 1906.

7 SHEETS—SHEET 6

WITNESSES:

INVENTOR
Frank M. Peters
BY
his ATTORNEY

No. 881,439. PATENTED MAR. 10, 1908.
F. M. PETERS.
DOUGH SHEETING MACHINE.
APPLICATION FILED OCT. 8, 1906.
7 SHEETS—SHEET 7.
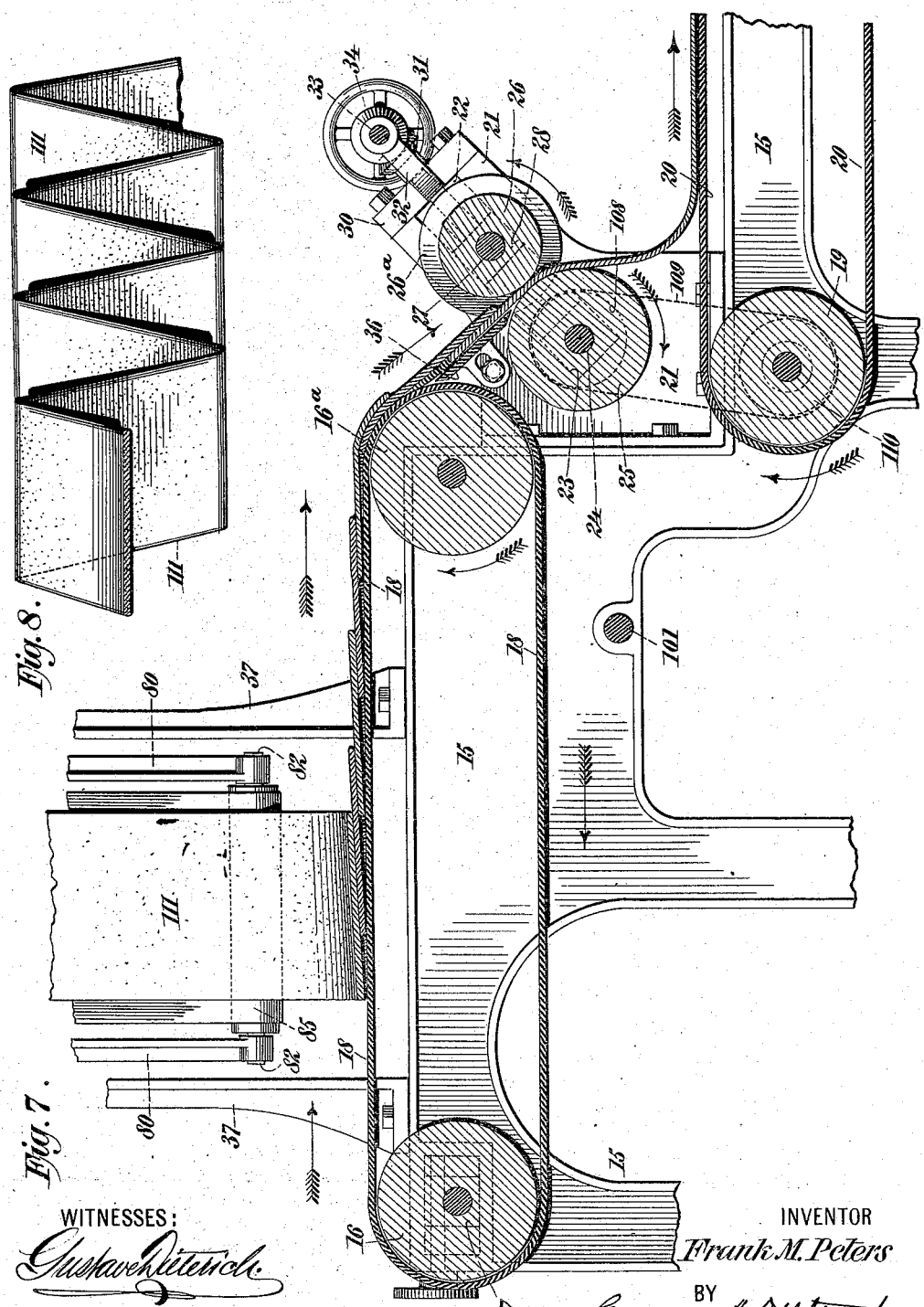
WITNESSES:
Gustave Dieterich.
Edwin H. Dieterich.
INVENTOR
Frank M. Peters
BY
Conrad A. Dieterich
his ATTORNEY

UNITED STATES PATENT OFFICE.

FRANK M. PETERS, OF CHICAGO, ILLINOIS.

DOUGH-SHEETING MACHINE.

No. 881,439.  Specification of Letters Patent.  Patented March 10, 1908.

Application filed October 8, 1906. Serial No. 337,968.

*To all whom it may concern:*

Be it known that I, FRANK M. PETERS, a citizen of the United States, residing at the city of Chicago, Cook county, in the State of Illinois, have invented certain new and useful Improvements in Dough-Sheeting Machines, of which the following is a full, clear, and exact specification.

My invention relates to improvements in machinery for working dough, and the same has for its object more particularly to provide a machine for sheeting and lapping the dough in such a manner that the same will, in passing between the rolls, first be rolled in a direction parallel with the length of the sheet of dough, and thereupon the sheet folded or lapped in a direction substantially as right angles to its length, and thence caused to pass between a second set of rollers, and the lapped or folded sheet of dough again rolled, thus causing the sheet which has been folded or lapped at right angles to its length to be rolled out to a certain extent in each direction, and thereby simulating by mechanical means the common operation of manually rolling out a lump of dough first in one direction, then lapping or folding the same upon itself and again rolling it out in a direction at right angles to the first rolling.
Further said invention has for its object to partially knead or shape the dough in the hopper preparatory to its passing between the first set of rollers in order to insure the discharge of a proper quantity of dough from said hopper.

To the attainment of the aforesaid objects and ends my invention consists in the novel details of construction, and in the combination, connection and arrangements of parts hereinafter more fully described and then pointed out in the claims.

Figure 1:
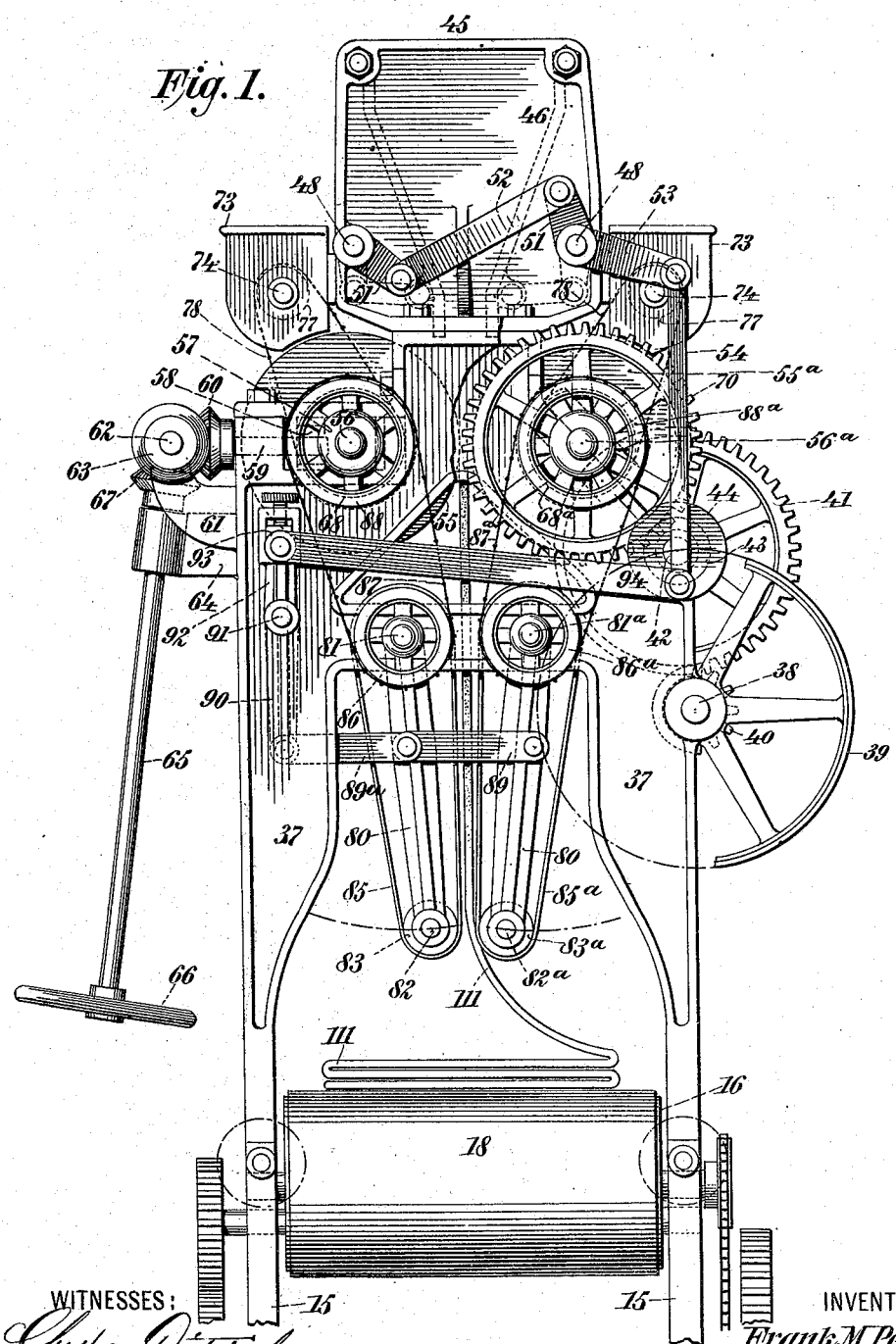
Figure 2:
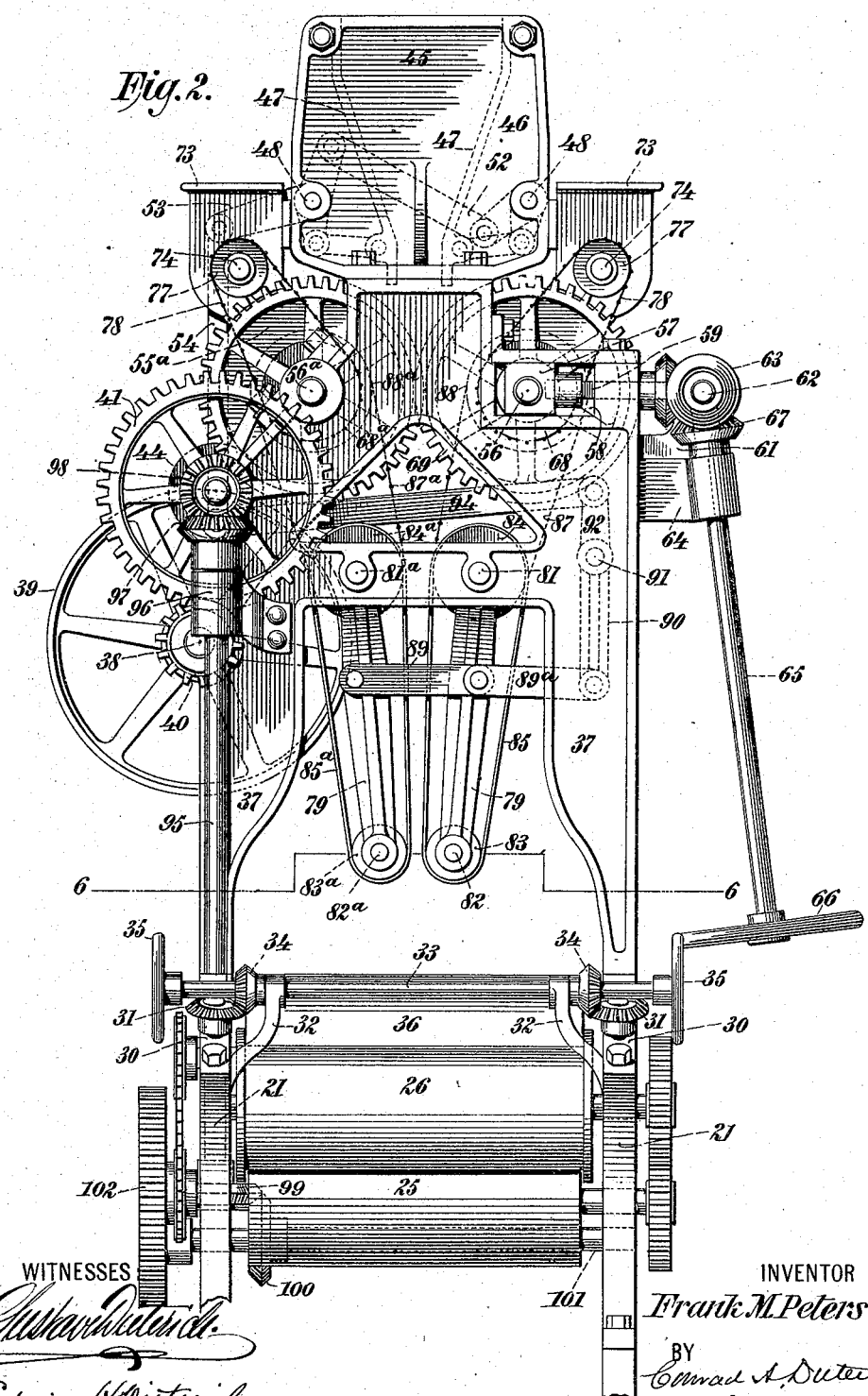
Figure 3:
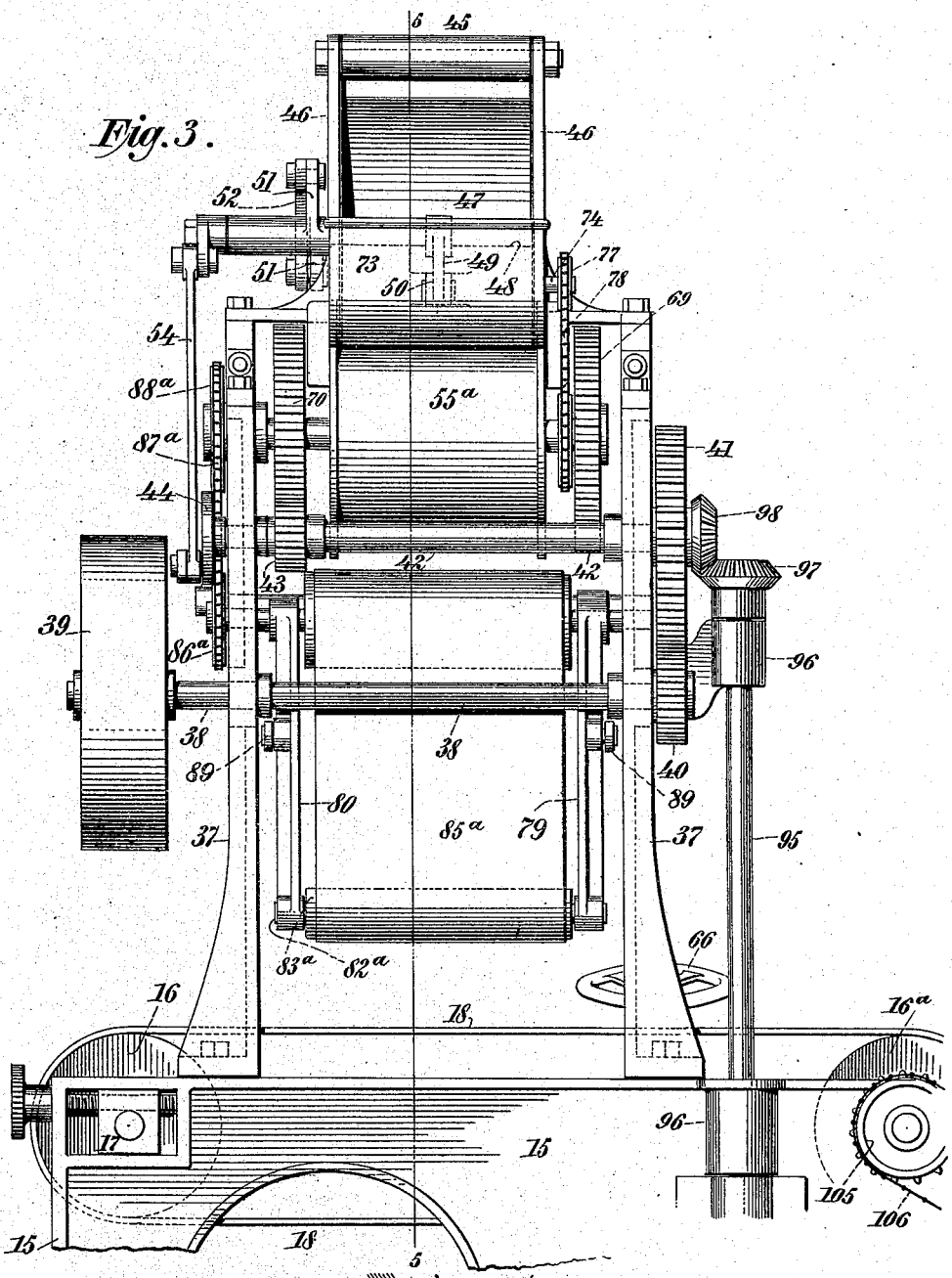
Figure 4:
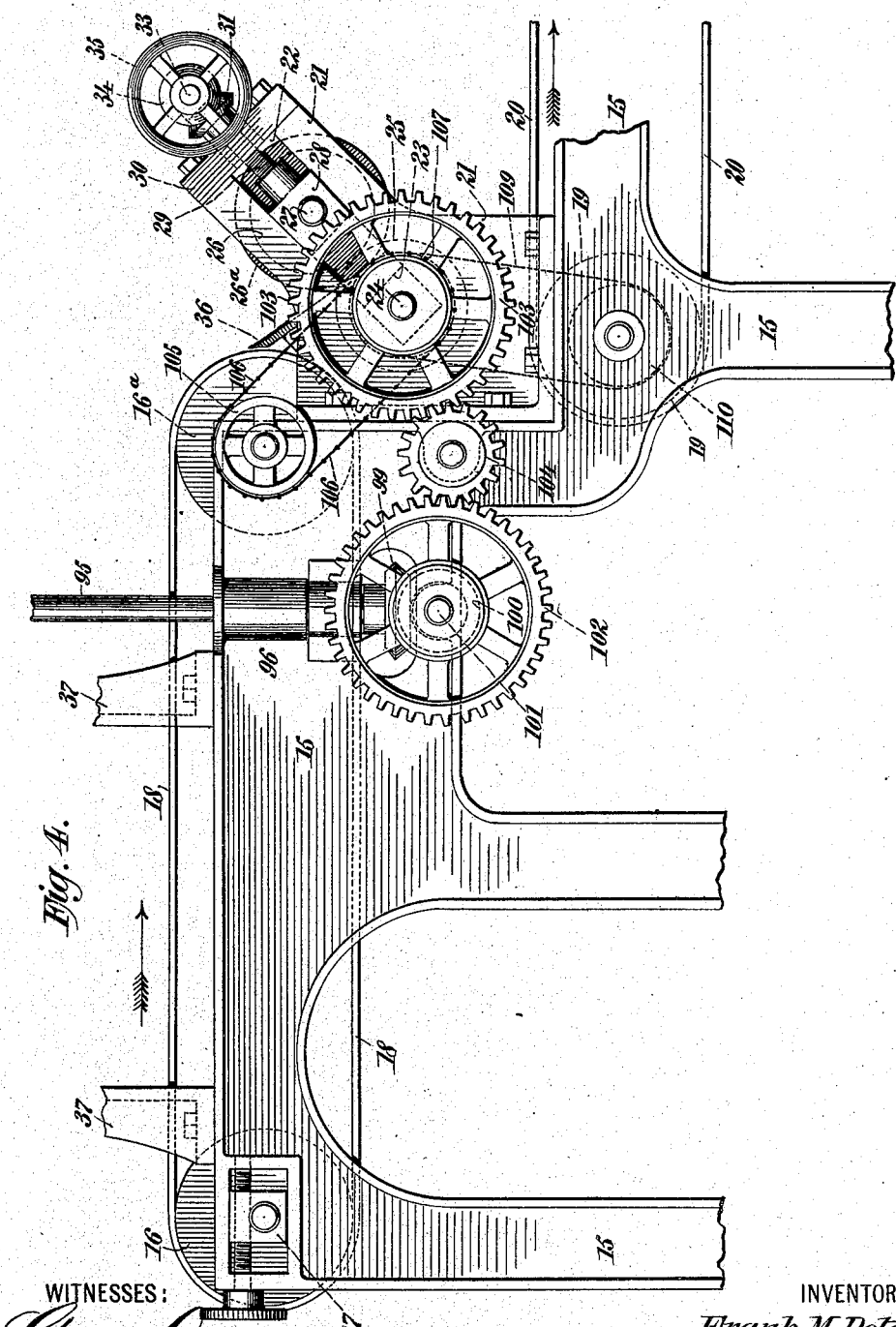
Figure 5:
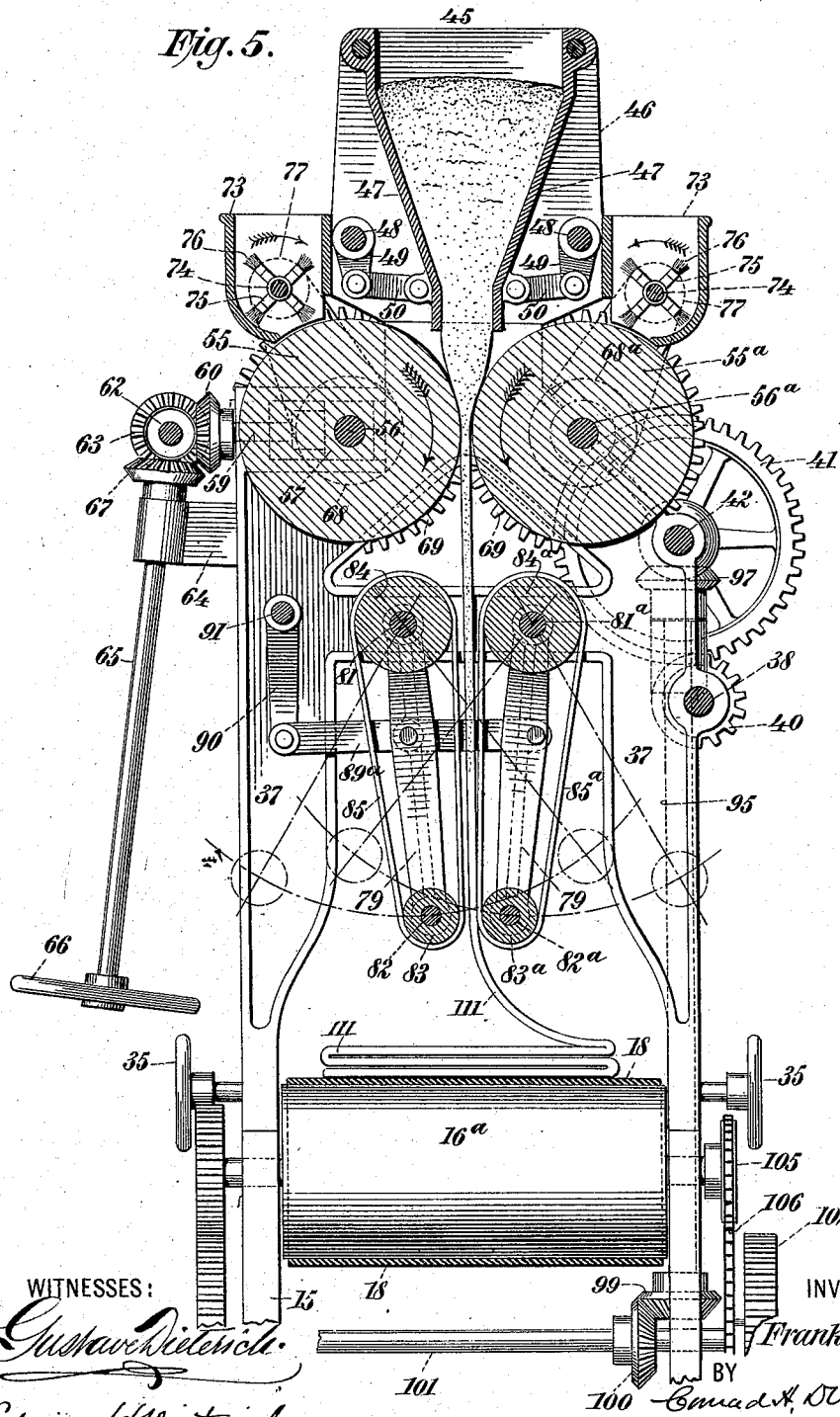
Figure 6:
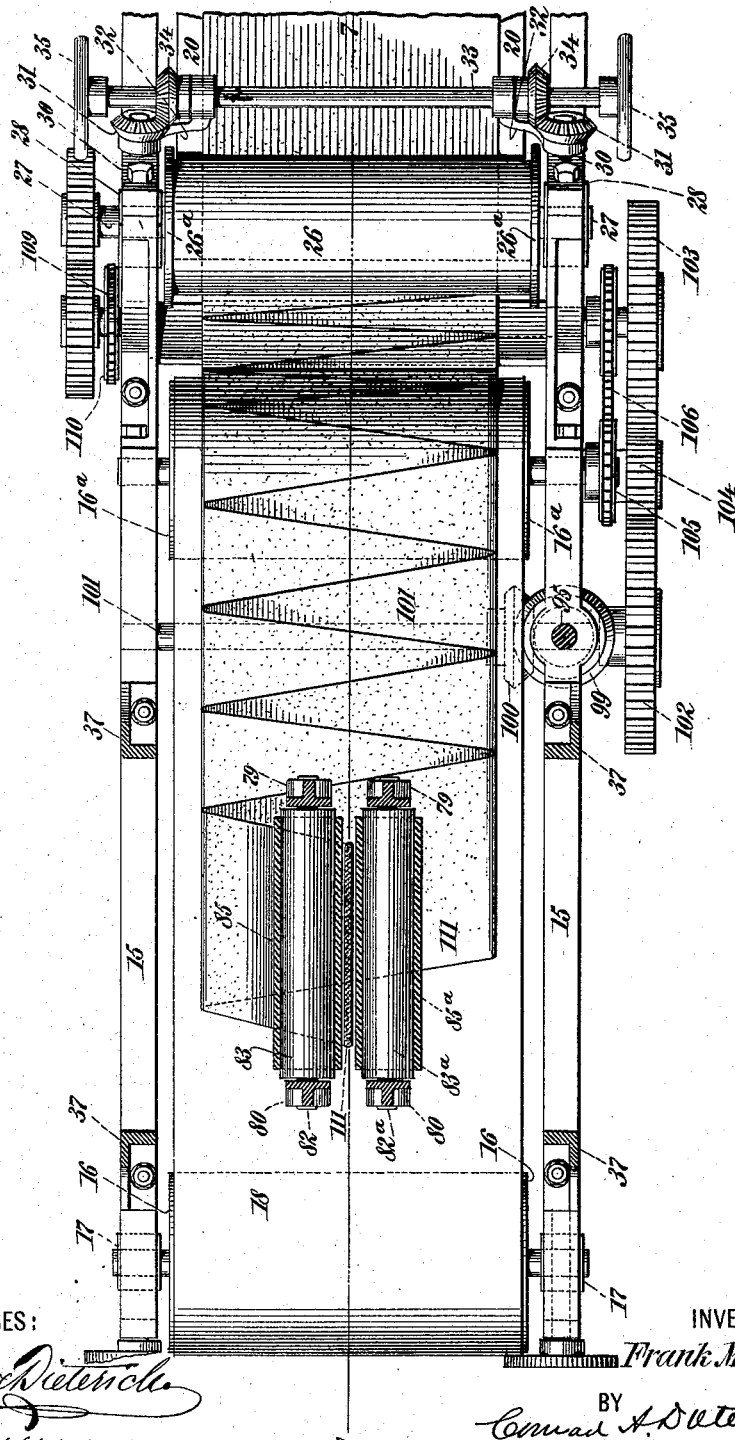

In the accompanying drawings forming part of this specification, wherein like numerals of reference indicate like parts, Figure 1 is a rear end view, partly broken away, illustrating the upper portion of a machine constructed according to, and embodying my said invention; Fig. 2 is a front end view of the same; Fig. 3 is a side view thereof; Fig. 4 is a construction of Fig. 3 showing the lower part of the machine; Fig. 5 is a section taken on the line 5—5 of Fig. 3; Fig. 6 is a section taken on the line 6—6 of Fig. 2, showing a portion of the machine in plan; Fig. 7 is a longitudinal section of a portion of the machine, taken on the line 7—7 of Fig. 6, and Fig. 8 is a detail plan view showing a portion of a sheet of dough lapped and prior to its passage between the second set of rolls.

In said drawings 15 designates the lower frame of the machine at the left-hand end of which are revolubly mounted transverse rollers 16, 16ª, the former being supported in an adjustable bearing 17, and 18 denotes an endless belt arranged upon said rollers 16, 16ª. At the right-hand end of the frame 15, but in a lower horizontal plane, are mounted two similar transverse rollers 19, 19ª (the latter not shown) over which passes an endless belt 20.

21, 21 denote brackets bolted to the opposite side of the frame 15 intermediate the rollers 16ª and 19, which brackets are provided with angularly disposed recesses 22, 22 in which are arranged bearing blocks 23, 23 having mounted therein the ends of a shaft 24 carrying a roller 25, and 26 denotes a roller mounted above the roller 25 having flanges 26ª, 26ª, which overlap the ends of said roller 25.

27 denotes a shaft which carries the roller 26 and is adjustably supported in bearing blocks 28 28 also working in the recesses 22, 22 of the brackets 21, 21.

29 29 denote short shafts which extend through the tops 30, 30 of the brackets 21, 21 and are provided with threaded portions, and have their lower ends engaging the bearing blocks 28, 28, and their upper ends provided with bevel gears 31, 31.

32, 32 denote bearings secured to the tops 30, 30 in which is supported a transverse shaft 33 having fixed thereon bevel gears 34, 34 meshing with the bevel gears 31 31 aforesaid, and at its opposite ends handwheels 35 35 for adjusting the roller 26 relative to the roller 25.

36 denotes a flat plate which is adjustably secured at its opposite ends to the inner sides of the brackets 21 21 intermediate the rollers 16ª and 19 which serves to guide the lapped sheet of dough from the roller 16ª to the roller 19 in its passage from the endless belt 18 to the endless belt 20.

Upon the left-hand end of the frame 15 are bolted the vertical frame members 37, 37 in which is supported about midway of their height and longitudinally of the machine a main driving shaft 38 having a pulley 39 fixed thereon at one end, and a small gear 40 at its opposite end which meshes with a large gear 41 fixed upon one end of a shaft 42 supported in the frame members 37 37 directly above the main shaft 38.

43 denotes a small gear fixed on said shaft 42 intermediate the frame members 37, 37 and 44 an eccentric disk fixed upon the other end of said shaft.

Upon the tops of the frame members 37 37 is disposed a dough hopper 45 consisting of two side plates 46 46 which are rigidly secured to the upper ends of said frame members 37 37 and hinged plates 47 47 which are disposed between the side plates 46, 46 and pivotally secured at their upper ends thereto. In the lower portions of said rigid side plates 46, 46 adjacent to their opposite edges are supported shafts 48, 48 having fixed thereon near their centers depending arms 49 49 and 50, 50 denote links which are pivotally secured to the lower ends of the arms 49 49 and the lower ends of the hinged plates 47 47. Upon the outer ends of the shafts 48 48 are fixed short arms 51, 51, one of which extends upwardly and the other downwardly and have their ends pivotally secured to the opposite ends of a link 52, and 53 denotes a longer arm secured to one of said shafts 47 and has its outer end pivotally secured to the upper end of a link 54 which is pivotally secured at its lower end to the eccentric disk 44 on the shaft 42.

Arranged longitudinally of the machine and directly below the hopper 45 are mounted sheeting rolls 55, 55$^a$. The roll 55$^a$ being supported upon a shaft 56$^a$ mounted in fixed bearings in the frame members 37, 37, and the roll 55 supported upon a shaft 56 mounted in bearing blocks 57 57 working in horizontal slots 58, 58 in said frame members 37 37, and 59 59 denote short shafts having their inner ends in engagement with the bearing blocks 57, 57, and their outer ends provided with bevel gears 60, 60. The intermediate portions of said shafts 59, 59 are screw-threaded and work in threaded bearings arranged in the frame members at the outer ends of the slots 58, 58.

Upon the sides of the frame members 37 37 adjacent to the horizontal slots 58, 58 are secured brackets 61 61 which form bearings for a longitudinal shaft 62 having bevel gears 63, 63 fixed thereon at its opposite ends meshing with the bevel gears 60, 60, and adjacent to one of said brackets 61 is secured a bearing 64 in which is mounted a vertically inclined shaft 65 having a hand-wheel 66 at its lower end and a bevel gear 67 at its upper end meshing with one of the bevel gears 63 on the longitudinal shaft 62.

At the left-hand ends of the roll shafts 56 56$^a$ (front ends in Fig. 2 and rear ends in Figs. 1 and 5) are fixed sprocket wheels 68, 68$^a$, and intermeshing gears 69 69 and at the left-hand end of the shaft 56$^a$ is fixed a larger gear 70 in mesh with a small gear 43 on the shaft 42 and at the right-hand ends of said roll shafts 56 56$^a$ are fixed sprocket wheels 88 88$^a$ respectively.

At each side of the hopper 45 above the sheeting rolls 55 55$^a$ are secured dust boxes 73 73 which are provided with openings in their bases discharging the flour upon said rolls 55 55$^a$. Within said boxes are supported transverse shafts 74 74 upon which are mounted agitators 75 75 carrying at their ends brushes 76 76, and upon the outer projecting ends of said shafts 74 74 are fixed sprocket wheels 77 77 which are connected by chains 78 78 with the sprocket wheels 68 68$^a$ on the roll shafts 56 56$^a$.

Below the sheeting rolls 55 55$^a$ is disposed the lapping or folding mechanism comprising oscillating arms 79 79 and 80 80 having their upper ends pivotally secured to supporting shafts 81, 81$^a$ supported in the frame members 37 37 and the lower ends of each pair connected by shafts 82 82$^a$ respectively upon which are mounted rolls 83 83$^a$. Upon the supporting shafts 81 81$^a$ intermediate the ends of each set of arms 79, 79 and 80 80 are mounted rolls 84 84$^a$ over which and the rolls 83 83$^a$ pass endless belts 85, 85$^a$ respectively.

86 86$^a$ denote sprocket wheels fixed upon the supporting shaft adjacent to their left hand ends (see Fig. 3) and connected by chains 87, 87$^a$ with sprocket wheels 88 88$^a$ fixed upon the ends of the roll shafts 56 56$^a$.

The arms 79 79, 80 80 are connected together by links 89 89 so as to cause the same to oscillate in fixed relation to each other.

89$^a$, 89$^a$ denote links which are pivotally connected at their ends to the ends of the links 89, 89 and at their opposite ends to the lower ends of depending arms 90 90 fixed upon a shaft 91 mounted in the frame members 37 37.

92 denotes an upwardly extending arm also fixed upon said shaft 91 in line with the depending arm 90 thereon. The upper end of said arm 92 is slotted and provided with an adjustable bearing 93 to which is pivotally connected one end of a link 94 pivotally connected at its other end to the pivot on the eccentric disk 44 on the shaft 42.

To transmit movement from the main driving shaft 38 to the second set of sheeting rolls 25 26 and the endless conveyer belts 18, 20 a vertical shaft 95 is supported at one side of the machine in bearings 96, 96 secured to the frame members 37 and 15. At the upper end of said shaft 95 is fixed a bevel gear 97 meshing with a bevel gear 98 fixed upon the end of the shaft 42, and upon the lower end of said vertical shaft 95 is fixed a bevel gear 99 (see Fig. 5) in mesh with a bevel gear 100 fixed on a transverse shaft 101 supported in bearings in the frame 15 adjacent to the second set of sheeting rolls 25 26. At the forward end of the transverse shaft 101 is fixed a large gear 102 from which movement is transmitted to a gear 103 fixed on the roll shaft 24 through an intermediate gear 104.

105 denotes a sprocket wheel fixed at the forward end of the shaft of the roller 16ª, and connected by a chain 106 with a sprocket wheel 107 fixed on the shaft 24 of the roller 25 for transmitting movement to the conveyer belt 18, and at the rear end of said roller shaft 24 is fixed a sprocket wheel 108 which is connected by a chain 109 with a sprocket wheel 110 fixed upon the rear end of the shaft of the roller 19 for transmitting movement to the conveyer belt 20.

The operation of the machine is as follows: Assuming the machine to be in operation a quantity of dough is placed in the hopper 45, where the same will be kneaded by the oscillations of the hinged plates 47 47 and issue from the bottom of said hopper in the form of an enlarged mass of rectangular outline in cross-section and pass between the first set of sheeting rolls 55, 55ª. Movement being transmitted from the driving shaft 38 to the hinged plates 47, 47 through the gears 40, 41 shaft 42, eccentric disk 44, link 54, arm 53, arms 51 51 and link 52 to the shafts 48 48, and arms 49 49 and links 50 50 arranged intermediate the lower ends of said hinged plates 47, 47 and the shaft 48 48, rotary movement being imparted to the sheeting rolls 55, 55ª through the shaft 42, gears 43 and 70, and intermeshing gears 69 69. Rotation being also imparted to the agitators 75 75 in the flour dust boxes 73 73 by means of the sprocket wheels 77 77, belts 78 78 and sprocket wheels 68 68ª on the roll-shafts 56 56ª. The belts 85 85ª of the lapping or folding mechanism are actuated by means of the sprocket wheels 86 86ª, belts 87 87ª and sprocket wheels 88 88ª on the roll shafts 56 56ª, and the oscillation of the arms 79 79 and 80 80 effected by means of the links 89 89 89ª, 89ª arms 90 90 and 92 on the shaft 91 and link 94 connected to the eccentric disk 44 on the shaft 42. Movement is transmitted from the driving shaft 38 to the endless conveyer belts 18, 20 by means of the vertical shaft 95 and the intermediate gearing. From the sheeting rolls 55, 55ª the dough emerges in the form of a narrow sheet 111, and passes between the endless belts 85 85 of the lapping mechanism by means of which the sheet is delivered to the endless belt 18 folded to a position substantially at right angles to the length of the dough sheet, as shown at Fig. 8, in which condition the same is delivered to the second set of sheeting rolls 25 26 and after passing through the same is received upon the endless conveyer belt 20.

In the operation of the machine it will be observed that the mass of dough is first kneaded and shaped for the action of the first set of sheeting rolls 55 55ª which serve to roll the dough in a direction parallel to its length, and that subsequently the sheet of dough is folded to a position at substantially right angles to its length in which condition it is subjected to the action of the second set of rolls 25 26. Thus the dough is first rolled in one direction, then lapped, and thereafter rolled in said condition in a direction at right angles to its initial rolling thereby carrying into effect by mechanical agency the usual practice of rolling dough in two directions.

By turning the hand wheel 66 on the shaft the distance between the sheeting rollers 55 55ª may be adjusted to vary the thickness of the sheet of dough, and by actuating the handwheels 35 on the transverse shaft 33 the roller 26 may be adjusted.

Having thus described my invention, what I claim and desire to secure by Letters Patent is:

1. In a machine of the character described the combination with a source of dough supply, means for working said dough into a continuous sheet, and additional means adapted to act upon said continuous dough sheet transversely of its length, substantially as specified.

2. In a machine of the character described, the combination with a source of dough supply, sheeting means for working said dough into a continuous sheet, and sheeting means adapted to act upon said continuous sheet transversely to the direction of the grain imparted thereto by said first named sheeting means, substantially as specified.

3. In a machine of the character described, the combination with means for working the dough into a continuous elongated mass, of sheeting means for working said elongated mass into a continuous sheet, and sheeting means adapted to act upon said continuous dough sheet transversely thereof, substantially as specified.

4. In a machine of the character described, the combination with a source of dough supply, of two sets of sheeting means adapted to work said dough into a continuous dough sheet, and means for lapping said dough sheet transversely of its length intermediate said two sets of sheeting means, substantially as specified.

5. In a machine of the character described, the combination with a source of dough supply, of two sets of sheeting means adapted to act successively upon said dough to work the same into a continuous dough sheet, and means for lapping said dough sheet transversely of its length intermediate said first and second sheeting means, substantially as specified.

6. In a machine of the character described, the combination with a source of dough supply, of two sets of sheeting rolls adapted to act successively upon said dough to work the same into a continuous dough sheet, and lapping mechanism arranged intermediate said first and second sets of sheeting rolls for lapping said dough sheet transversely of its length, substantially as specified.

7. In a machine of the character described, the combination with means for working the dough into an elongated mass, of sheeting mechanism adapted to convert said mass into a sheet, means for lapping said sheet in folds and disposing the same transversely of the length of said dough sheet and additional sheeting means acting upon said lapped dough sheet, substantially as described.

8. In a machine of the character described, the combination with means for working the dough into an elongated mass, of sheeting mechanism adapted to convert said mass into a sheet, means for lapping said sheet in overlapping folds arranged transversely of the dough sheet, and additional sheeting means for re-sheeting said lapped dough sheet, substantially as specified.

9. In a machine of the character described, the combination with means for working the dough into an elongated mass, of sheeting mechanism adapted to convert said mass into a sheet, means for lapping said sheet in overlapping folds arranged transversely of the dough sheet, and additional sheeting means arranged to operate at right angles to said first named sheeting means for re-sheeting said lapped dough sheet, substantially as described.

10. In a machine of the character described, the combination with a traveling support, of means for working the dough into an elongated mass, of sheeting mechanism adapted to convert said mass into a sheet, means for lapping said dough sheet upon said traveling support in folds arranged transversely of the dough sheet, and additional sheeting mechanism arranged to operate at an angle to said first named sheeting mechanism for resheeting said lapped dough sheet, substantially as described.

11. In a machine of the character described, the combination with a traveling support, of a pair of sheeting rolls, means for supplying a mass of dough thereto, lapping mechanism arranged adjacent to said sheeting rolls and adapted to oscillate transversely of said traveling support for depositing the dough sheet thereon in folds arranged transversely of the length of the dough sheet, and a second pair of sheeting rolls adapted to re-sheet said lapped dough sheet, substantially as described.

12. In a machine of the character described, the combination with a traveling support, of a pair of sheeting rolls, means for supplying a mass of dough thereto, lapping mechanism arranged adjacent to said sheeting rolls and adapted to oscillate transversely of said traveling support for depositing the dough sheet thereon in overlapping folds arranged transversely of the dough sheet, and a second pair of sheeting rolls arranged at right angles to said first named pair of sheeting rolls for resheeting said lapped dough sheet, substantially as described.

13. In a machine of the character described, the combination with an endless traveling support, of a dough hopper, a pair of sheeting rolls arranged adjacent thereto, means for discharging the dough from said hopper to said sheeting rolls in an elongated mass, lapping mechanism arranged below said sheeting rolls comprising a pair of pivotally supported arms, rollers intermediate the upper and lower ends of said arms, and endless belts arranged upon said rollers, means for oscillating said lapping mechanism whereby to deposit the dough sheet upon said endless traveling support in folds arranged transversely of the dough sheet, and a second set of sheeting rolls arranged at right angles to said first named sheeting rolls for resheeting said lapped dough sheet, substantially as specified.

14. In a machine of the character described, the combination with an endless traveling support, of a dough hopper having a part of its side walls fixed and a part movable means for actuating said movable part of its side walls to discharge the dough in the form of an elongated mass, a pair of sheeting rolls mounted below said dough hopper, lapping mechanism arranged below said sheeting rolls and adapted to oscillate transversely of said endless traveling support, means for actuating said lapping mechanism whereby to deposit the dough sheet upon said endless traveling support in folds arranged transversely of the dough sheet, and a second set of sheeting rolls for resheeting said lapped dough sheet, substantially as specified.

15. In a machine of the character described, the combination with an endless traveling support, of a dough hopper having two of its opposite side walls pivotally supported at their tops between the fixed walls thereof, and means secured to the lower ends of said pivoted walls for oscillating the same, a pair of sheeting rolls mounted below said dough hopper, lapping mechanism arranged below said sheeting rolls and adapted to oscillate transversely of said traveling support, means for actuating said lapping mechanism to deposit the dough sheet in folds arranged transversely of said endless traveling support and said dough sheet, and a second set of sheeting rolls for resheeting said lapped dough sheet, substantially as described.

16. In a machine of the character described, a dough hopper having two of its side walls rigid and two opposing side walls pivotally secured at their upper ends to said rigid walls, shafts supported in said rigid walls adjacent to the lower ends thereof, means connecting said shafts into the lower ends of said hinged walls, and means for actuating said shafts to continuously oscillate said hinged walls, substantially as described.

17. In a machine of the character described, a dough hopper having two of its side walls rigid, and two opposing side walls pivotally secured at their upper ends to said rigid walls, shafts mounted in said rigid walls adjacent to the lower ends of the hinged walls, arms fixed upon said shafts, links connecting said arms with the lower ends of said hinged walls, and means for simultaneously oscillating said hinged walls towards each other, substantially as described.

18. In a machine of the character described, a dough hopper having two of its side walls rigid, and two opposing side walls pivotally secured at their upper ends to said rigid walls, shafts mounted in said rigid walls adjacent to the lower ends of the hinged walls, arms fixed upon said shafts, links connecting said arms with the lower ends of said hinged walls, arms fixed upon the outer ends of said arms and extending in opposite directions therefrom, a link connecting the ends of said arms, and means for actuating said shafts, substantially as described.

19. In a machine of the character described, a dough lapping and folding mechanism comprising a plurality of frame members each composed of a pair of arms pivotally supported at their upper ends, rollers intermediate the upper and lower ends of each frame member, an endless belt extending over said rollers, a link connecting said frame members, and means for actuating said rollers and belts and oscillating said frame members, substantially as described.

20. In a machine of the character described, a dough lapping and folding mechanism comprising a plurality of frame members each composed of a pair of arms pivotally supported at their upper ends, rollers mounted parallel with each other in the upper and lower ends of said frame members, an endless belt arranged upon the rollers of each frame member, a link connecting said frame members, and means for simultaneously actuating said rollers and belts and oscillating said frame members, substantially as described.

Signed at the city of New York, in the county and State of New York, this fourth day of October, nineteen hundred and six.

FRANK M. PETERS.

Witnesses:
H. H. HUNGERFORD,
F. W. WALKER.